US006740206B2

United States Patent
Genser

(10) Patent No.: US 6,740,206 B2
(45) Date of Patent: May 25, 2004

(54) ROTARY EVAPORATOR WITH A PENDULUM SYSTEM WITH AN OFFSET FULCRUM

(76) Inventor: Hans Georg Genser, Bölleinsmühle, D-91639 Wolframs-Eschenbach (DE)

( * ) Notice: Subject to any disclaimer, the term of this patent is extended or adjusted under 35 U.S.C. 154(b) by 0 days.

(21) Appl. No.: 10/079,786

(22) Filed: Feb. 20, 2002

(65) Prior Publication Data

US 2002/0148718 A1 Oct. 17, 2002

(30) Foreign Application Priority Data

Feb. 21, 2001 (DE) .......................... 101 08 242

(51) Int. Cl.[7] ................................. B01D 3/08
(52) U.S. Cl. .................. 202/238; 202/189; 159/6.1; 196/112; 122/11; 122/12
(58) Field of Search ............... 202/238, 189; 159/6.1; 203/DIG. 2; 422/101; 122/11, 12; 196/112

(56) References Cited

U.S. PATENT DOCUMENTS

| | | | | |
|---|---|---|---|---|
| 2,575,688 A | * | 11/1951 | Smith .......................... | 202/153 |
| 2,695,871 A | * | 11/1954 | Shavel, Jr. et al. .......... | 202/205 |
| 3,342,696 A | * | 9/1967 | Bush ........................... | 202/172 |
| 4,738,295 A | * | 4/1988 | Genser ........................ | 159/6.1 |
| 4,759,825 A | * | 7/1988 | Medvey et al. .............. | 202/181 |
| 4,780,178 A | * | 10/1988 | Yoshida et al. ............... | 159/6.1 |
| 5,337,806 A | * | 8/1994 | Trunner ........................ | 165/47 |
| 5,611,895 A | * | 3/1997 | Genser ........................ | 202/182 |
| 5,639,354 A | * | 6/1997 | Zellweger .................... | 202/238 |

FOREIGN PATENT DOCUMENTS

| | | | |
|---|---|---|---|
| DE | 2700894 | * | 7/1978 |
| EP | 0149972 | * | 11/1984 |
| EP | 0156937 | * | 10/1985 |
| GB | 2146542 | * | 4/1985 |

* cited by examiner

*Primary Examiner*—Virginia Manoharan
(74) *Attorney, Agent, or Firm*—Sidley Austin Brown & Wood, LLP

(57) ABSTRACT

A rotary evaporator including a rotating flask (2) to hold the substances to be evaporated, and a drive (6) to rotate the rotating flask around an axis of rotation (R) that runs through the rotating flask, wherein the rotating flask additionally can be swiveled around a swiveling axis (S) which runs outside of the rotating flask and, relative to the force of gravity (G), runs above the axis of rotation of the rotating flask.

19 Claims, 3 Drawing Sheets

ROTARY EVAPORATOR WITH A PENDULUM SYSTEM WITH AN OFFSET FULCRUM

BACKGROUND OF THE INVENTION

1. Field of the Invention

The present invention relates to a rotary evaporator.

2. Description of the Prior Art

Rotary evaporators are known which are used to evaporate substances, particularly to evaporate solvents when pharmaceutical or chemical products are concentrated or distilled. With these known rotary evaporators, the liquid substances to be evaporated are placed into the hollow chamber of a rotatable rotating flask (evaporation vessel), usually in a heating bath. By rotating the flask, a thin liquid film is formed on the inside of the rotating flask and the substances, especially the solvent, then evaporate from this film. Some of the substance or solvent also evaporates directly from the surface of the liquid that is in the rotating flask. The vapor is conveyed from the rotating flask via a vapor line to a condenser, where it condenses out again. Generally speaking, a negative pressure or a vacuum is also generated in the rotating flask in order to raise the vapor pressure of the substances to be evaporated and to protect the product. In a passage area, the vapor line is joined to the rotating flask via a rotatable connection. The connection site is sealed off by of a rotary gasket.

German patent specification DE 1 224 062 discloses a rotary evaporator with a rotating flask that can be rotated around its axis of symmetry. The rotating flask is placed tightly on the standard tapered-ground joint of a glass adapter whose tapered part is inserted into the conical bore of a support ring having a worm gear crown. For purposes of driving the rotating flask, a screw attached to the drive shaft of a small electric motor equipped with a switch then engages the worm gear crown. The support ring can rotate in a ball bearing of a housing to which the motor as well as a condenser are affixed. The work flask can also pivot freely around a swiveling axis that runs perpendicular to its axis of symmetry. For this purpose, the housing has a bearing plate into whose bore a rigid, horizontal guide shaft of the apparatus stand has been inserted so as to rotate freely, as a result of which the rotating flask can move freely around the guide shaft or the swiveling axis in a radius until it is floating freely on the surface of a water bath.

The free movement around the swiveling axis or pendulum axis parallel to the axis of symmetry of the rotating flask theoretically makes it possible to concentrate any quantity of liquid in a large rotating flask of any desired size, whereby the flask size or the quantity of liquid to be concentrated in one operation is only limited by the size of the rotating flask that still allows comfortable use without requiring a special lifting and lowering mechanism. Therefore, with a rotary evaporator having such a pendulum system, the weight of the rotating flask, together with the substance to be evaporated that is in the flask, is held up in the water bath exclusively by the buoyancy of the rotating flask, as a result of which torques and forces acting upon the rotating flask holder are markedly reduced. A thumb screw on the bearing plate serves to hold the rotating flask in any desired slanted position (swiveling position), also independently of the water bath.

Together with the rotating flask affixed to the glass adapter, the latter—which can be rotated by means of the rotary drive—is sealed by a gasket with respect to another, non-rotating glass adapter connected to the housing. This stationary glass adapter is connected to the other parts of the rotary evaporator apparatus by means of a bellows made of pure polytetrafluoroethylene. The bellows serves to compensate for the relative movement between the pivoting unit consisting of the rotating flask, the drive means, the housing and both glass adapters as well as the stationary apparatus stand that does not swivel along with the unit. This swiveling axis runs through the bellows in the vicinity of its point of intersection between both diagonals. The bellows can be deformed during the swiveling motion around an initial position in which its center axis runs essentially vertical, that is to say, parallel to the force of gravity. The swiveling axis for the pendulum movement of the rotating flask and the axis of symmetry of the rotating flask, which is provided as the axis of rotation, intersect at a point of intersection and thus lie on the same plane in every swiveling position. Therefore, the bellows is positioned laterally offset parallel to the swiveling axis, relative to the rotational movement of the stationary glass adapter of the rotating flask.

In order to remove precipitate that forms in the glass adapters, according to German patent specification DE 1 224 062, a delivery and washing nozzle is installed on the side of the stationary glass adapter that faces away from the glass adapter that rotates, said nozzle serving to spray a rinsing fluid, which is fed via a two-way tap, against the inside walls of the glass adapters. Any precipitate that might be present in the glass adapters can.be removed in this manner and returned to the rotating flask, together with the liquid that is being newly introduced.

German application DE 35 22 607 A1 discloses another rotary evaporator having a pendulum system. With this rotary evaporator, the weight contained in the rotating flask or changes in this weight as the rotating flask enters the bath liquid are ascertained by weighing, and the result of the weighing is employed as the regulating or control parameter for the evaporation process. With this known rotary evaporator, the pendulum axis or swiveling axis is likewise arranged perpendicular to the axis of rotation; however, the pendulum axis does not run in the same plane as the axis of rotation but rather, as seen in the direction of gravity, the pendulum axis is arranged below the axis of rotation of the rotating flask. In the working position of the rotating flask, the axis of rotation creates an acute angle with respect to the vertical, in other words, with respect to gravity, so that the rotating flask is immersed into the liquid bath downwards at an angle. On the one hand, a drive part that drives the flask neck with the rotating flask around the axis of rotation is mounted in a swiveling bearing so as to swivel on a stand around the pendulum axis, and on the other hand, the drive part is damped against the swiveling motion by a shock absorber that is likewise attached to the stand. On the side of the drive part that lies opposite from the rotating flask, there is a vapor pipe that does not rotate around the axis of rotation, but that swivels around the pendulum axis. The product to be introduced into the evaporation process is fed in parallel to the axis of rotation at the free end of the vapor pipe. A branch leads essentially horizontally from the vapor pipe to a condenser, where the evaporated product condenses and runs down as distillate into a distillate receiving vessel. In order to compensate for the pendulum movement of the vapor pipe relative to the drive means and of the rotating flask relative to the stationary condenser, a compensating element is installed in the branch. The center axis of the compensating element, which matches the direction of flow of the vapor, runs essentially horizontal.

If, like in German patent specification DE 1 224 062 or with the rotary evaporator according to German application DE 35 22 607 A1, a bellows is employed as the compensating element, under unfavorable conditions, precipitates can form in the bellows which, due to the horizontal arrangement of the bellows, can accumulate in the lower folds and can no longer drain. Moreover, the compensating element in German application DE 35 22 607 A1 is located relatively far away from the pendulum axis, as a result of which the compensating element undergoes a relatively strong deformation, especially bending, stretching and/or compression, during the pendulum movement, which can give rise to malfunctions in actual practice under certain conditions.

Accordingly, an object of the present invention is to provide a rotary evaporator with a pendulum system with which the above-mentioned drawbacks encountered in the state of the art are overcome, at least in part, or are at least reduced.

SUMMARY OF THE INVENTION

This and other objects of the present invention which will become apparent hereinafter, are achieved by providing a rotary evaporator including:

a) a rotating flask for holding a to-be-evaporated substance, b) a drive means to rotate the rotating flask around an axis of rotation (turning axis) that runs through the rotating flask, c) whereby the rotating flask additionally can be swiveled around a swiveling axis (pendulum axis) which
　c1) runs outside of the rotating flask and,
　c2) relative to the force of gravity, runs (is arranged) above the axis of rotation of the rotating flask.

A special advantage of the arrangement of the swiveling axis above the axis of rotation is that the area below the axis of rotation remains free and other components can be accommodated in this lower area. This allows a compact structure of the rotary evaporator. The terms axis of rotation and swiveling axis refer to geometrical axes or, expressed in mathematical terms, straight lines in space.

In a preferred embodiment, the axis of rotation is aligned essentially orthogonally to the swiveling axis. Preferably, the rotating flask is designed so as to be at least approximately rotationally symmetrical with respect to a center axis of the rotating flask in order to attain a uniform moment of inertia. Generally speaking, the axis of rotation coincides with the central axis of the flask, as a result of which unbalances are avoided during the rotational movement. The rotating flask is also generally mounted in at least one rotary bearing so as to be able to rotate around the axis of rotation.

In an advantageous embodiment of the inventive evaporator, for purposes of transporting the evaporated substance(s), the rotating flask is connected to one end of a vapor line that does not rotate along with the rotating flask. Another end of the vapor line is then preferably connected to a condenser for the condensation of the evaporated substance(s). The condenser is preferably arranged above the vapor line, relative to the force of gravity.

A particularly advantageous embodiment of the rotary evaporator is characterized in that there is at least one flexible compensating element in the vapor line. Here, a first vapor line segment extending between the rotating flask and the compensating element can be swiveled together with the rotating flask around the swiveling axis, while a second vapor line segment, which follows the compensating element and generally leads to the condenser, cannot be swiveled together with the rotating flask around the swiveling axis. The compensating element connects the two vapor line segments with each other so that they permit flow and it compensates for the position change between the two vapor line segments that is caused by the swiveling motion. The compensating element is usually a bellows or a flexible tube.

Preference is given to an embodiment in which the swiveling axis intersects the vapor line, that is to say, it runs through the vapor line. In this manner, leverage forces and moments of inertia can be kept low. It is particularly advantageous if the swiveling axis runs through the compensating element, preferably at least approximately through a mid-point of the compensating element, especially through a point of intersection of two diagonals of the compensating element. As a result of this, the deformation of the compensating element during the swiveling motion can be kept to a minimum.

Preferably, the second (stationary) vapor line segment is positioned essentially parallel to the force of gravity, at least in the area of the end that is connected to the compensating element.

In an advantageous embodiment, the rotary evaporator comprises a liquid bath into which the rotating flask is immersed or can be immersed, whereby the immersion and/or the position of the rotary evaporator in the liquid bath is established or changes automatically in response to the swiveling motion around the swiveling axis. The liquid bath generally serves as a source of heat for setting the process temperature in the rotating flask.

The rotating flask can preferably be freely swiveled around the swiveling axis within a prescribed swiveling range so that the swiveling angular position of the rotating flask and thus its position in the liquid bath are established on their own, due to the buoyancy of the rotating flask—with the substances it contains—in the liquid bath. As a result, the bearing and the holding brackets of the rotating flask are relieved of torques and leverage forces. Naturally, aside from a free swiveling bearing, it is also possible to provide a swiveling drive means in order to achieve a specific setting of the swiveling position of the rotating flask.

As a rule, the rotating flask faces downwards at an angle, in other words, it can be swiveled within a swiveling range between a position of the axis of rotation that is horizontal, that is to say, perpendicular to the force of gravity, and a position of the axis of rotation that is oriented vertically downwards, in other words, parallel to the force of gravity.

The arrangement of the swiveling axis with respect to the axis of rotation is preferably such that a vertical reference plane encompassing the axis of rotation and the force of gravity lies essentially perpendicular to the swiveling axis and, in every swiveling position of the rotating flask, the point of intersection of this reference plane with the swiveling axis, relative to the force of gravity, lies above a point of intersection of the axis of rotation with a vertical straight line that runs through the point of intersection of the reference plane with the swiveling axis in the direction of the force of gravity.

In a particularly advantageous embodiment, the swiveling axis is near the axis of rotation in order to keep the deflection or deformation of the compensating element small and/or the vapor path as short as possible. The distance between the swiveling axis and the axis of rotation preferably lies within a range from two times to six times the value of a diameter (or: a clear width) of the cross section of the vapor line.

In another embodiment, in a first line segment, the vapor line has a transition area, especially a bend, between a first area that runs parallel or coaxially to the axis of rotation and a second area that runs essentially perpendicular towards the swiveling axis. As a result of the angle created between the two areas of the first vapor line segment or the bend, the vapor path can make a direct transition from a partial path parallel to the axis of rotation to a perpendicular partial path, that is to say, parallel to the force of gravity so that a practically minimal vapor path can be achieved in the ascending direction of the vapor.

A reflux unit of the rotary evaporator is formed in that the condenser has a distillate receiver that is or can be connected via at least one closure element to a distillate vessel and in that, when the closure element is closed and the distillate receiver has been filled, distillate flows back into the rotating flask via the vapor line. The condenser is preferably positioned perpendicularly so that the force of gravity causes distillate to flow into the distillate receiver that is preferably arranged in the lower area of the condenser. The pronounced steepness or even vertical position of the vapor line is particularly advantageous for the return of the distillate since the force of gravity makes the distillate flow rapidly and without residues back into the bellows, for example. The distillate can also be returned to the rotating flask via another line which is optionally connected to another closure element located downstream from the distillate receiver.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The Drawings show.

The same elements in the figures have been designated with the same reference numerals in FIGS. 1 to 3.

DETAILED DESCRIPTION OF THE PREFERRED EMBODIMENT

Figure 1:
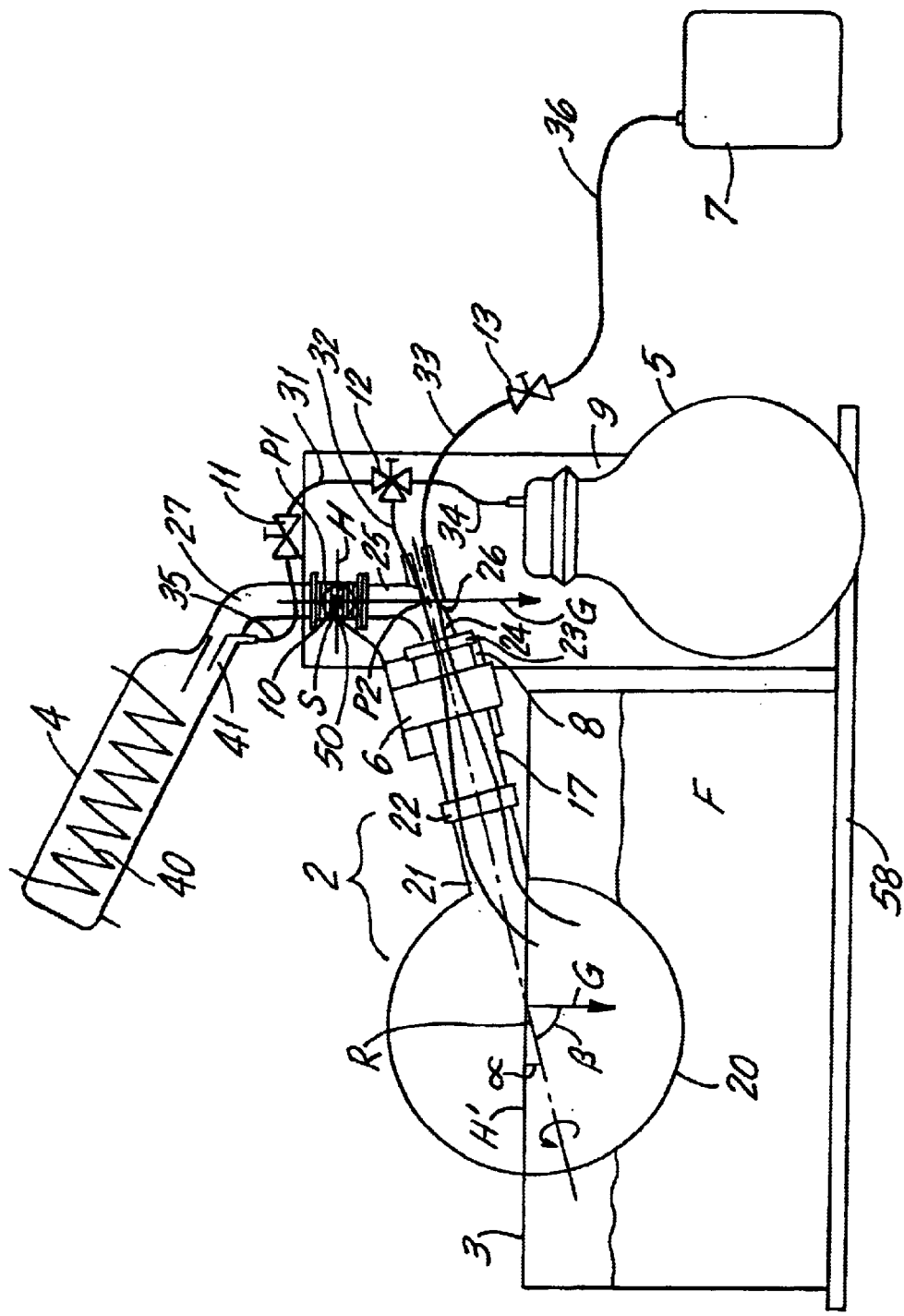
FIG. 1—a front view of a rotary evaporator, according to the present invention.
Figure 2:
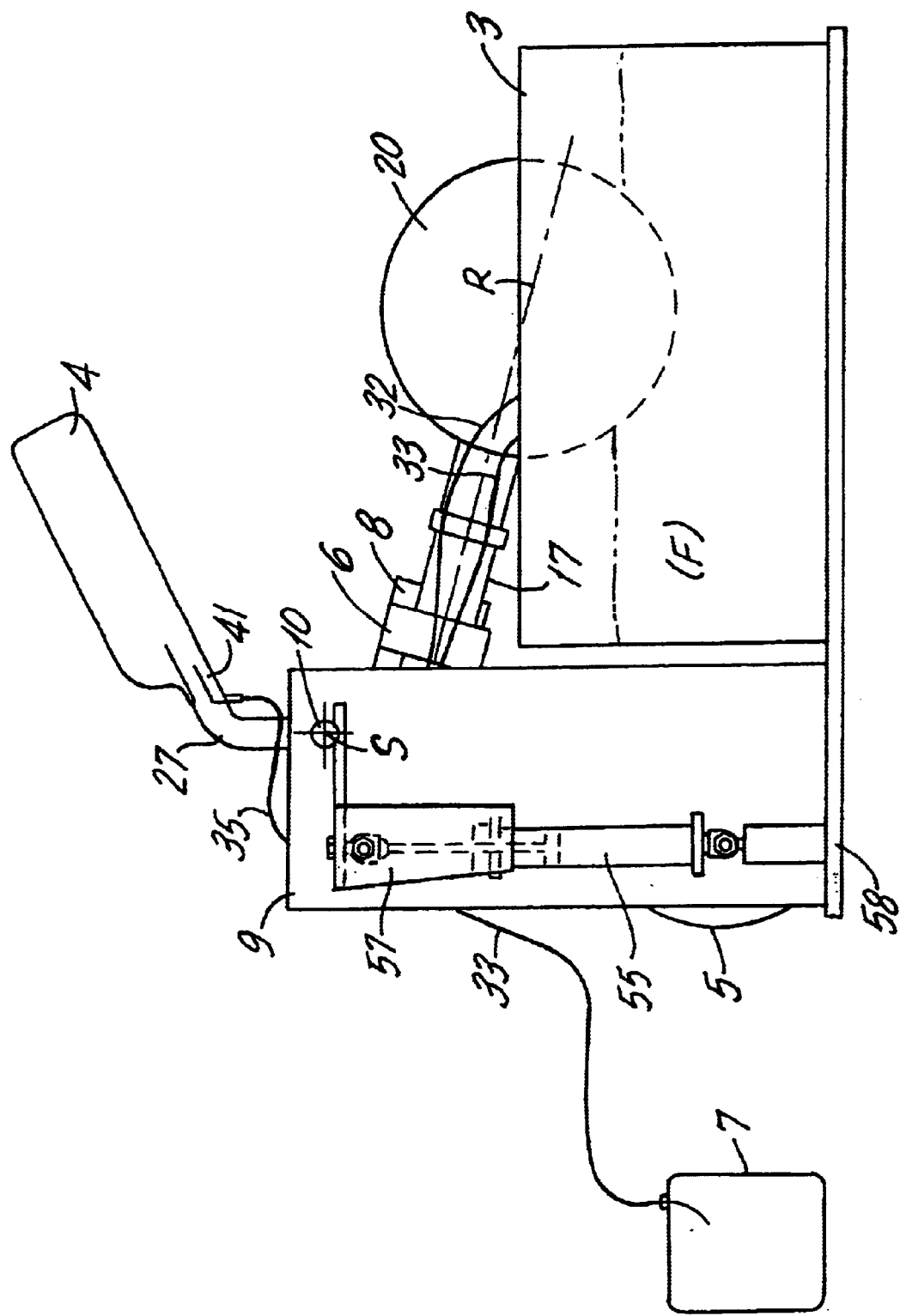
FIG. 2—a rear view of the rotary evaporator according to FIG. 1.

The rotary evaporator according to FIGS. 1 and 2 encompasses a rotating flask 2 that can be rotated around an axis of rotation R by a drive means 6. The rotating flask 2 is immersed into a liquid bath 3 holding a liquid F. The inclination of the axis of rotation R, relative to the horizontal H' positioned orthogonally to the force of gravity G, is designated by an angle $\alpha$ and the inclination of the axis of rotation R, relative to the vertical line that runs parallel to the force of gravity, is designated by an angle $\beta$, whereby $\alpha+\beta=90°$.

In the embodiment shown in the drawings, the rotating flask 2 is designed so as to be rotationally symmetrical to the axis of rotation R as the axis of symmetry and comprises an essentially spherical receiving area 20 to hold the liquid substance(s) to be evaporated and a fitting 21 that follows an opening in the spherical receiving area 20. The fitting 21 is connected via a flange connection 22 to a hollow shaft (pipe part) 17 that is driven by the drive 6.

Therefore, in the embodiment shown, the rotating flask 20 has the shape of a rotating flask.

On the opposite end of the drive 6, there is provided a stationary a receiving element 23 that does not rotate along, and a transport line 26 that serves to receive and hold the gaseous evaporated substance(s). The hollow shaft 17, together with the connected rotating fittings 21 of the rotating flask 20, is sealed against the non-rotating line 26 by a rotary gasket that is accommodated in the receiving element 23. The drive 6 and the receiving element 23 with the connected line 26 are both attached to and held in a housing 8 that extends upward with a swiveling arm approximately following the bend of the line 26. The arm is supported in a swiveling bearing 10 so as to pivot around a swiveling axis S.

Thus, the two lines 26 and 27 can be swiveled with respect to each other around the swiveling axis S. In this context, line 27 is kept stationary in the position shown, on a box-type support 9 that stands on a baseplate 58, whereas line 26 with the rotating flask 2, which is arranged so as to be stationary vis-à-vis line 26 relative to the swiveling axis 5, with the drive means 6 and with the receiving element 23 can be swiveled around the swiveling axis S. The swiveling bearing 10 is likewise held in the support 9 in the position determined by the swiveling axis S. Consequently, the swiveling axis S runs horizontally, that is to say, perpendicular to the force of gravity G.

Line 26 has a line portion 24 that runs essentially coaxially to the axis of rotation R, and a second line portion 25 that runs essentially parallel to the force of gravity G, these two portions forming together an obtuse angle of more than 90°, for instance, 100°. The two line portions 24 and 25 of the line 26 are connected to each other via a curved section. In particular, line 26 is designed as an angled pipe piece.

The vertical line section 25 opens into a compensating element 50 configured as a bellows on whose opposite side there is provided a vertical, additional line 27. The side of the line 27 facing the compensating element 50 is followed by a condenser 4.

Line 26 and line 27 are generally made of glass or of another rigid material that would be destroyed if kinked or bent due to the swiveling motion. For this reason, both lines 26 and 27 are flexibly connected to each other via the compensating element 50 so that a flexible flow-connection can be established between the two lines 26 and 27.

Consequently, the rotating flask 2 can be swiveled around the swiveling axis S in the swiveling bearing 10, as a result of which a pendulum system is formed. Therefore, the swiveling axis S and the swiveling bearing 10 can also be referred to as a pendulum axis or pendulum bearing, respectively. FIG. 1 shows a position in which the line portion 25 of the line 26 is aligned coaxially and parallel to line 27 and thus to the force of gravity G, as a result of which the compensating element 50 is in a relieved state with the central axis running parallel to the force of gravity G. When the rotating flask 2 is swiveled around the swiveling axis S, the mid-axes of the line area 25 of line 26 and of line 27 together form an angle that matches the swiveling angle from the zero position shown. Correspondingly, in the case of a clockwise swiveling motion (in the depiction in FIG. 1), the rotating flask 2 will rise upwards and somewhat to the left out of the liquid F of the liquid bath 3 so that the angle $\alpha$ between the horizontal H' and the axis of rotation R becomes smaller and the angle $\beta$ between the axis of rotation R and the force of gravity G becomes larger. In contrast, if the swiveling motion is counterclockwise, the rotating flask 2 will be immersed deeper into the liquid F of the liquid bath 3 so that the angle $\alpha$ becomes larger, and the angle $\beta$ becomes smaller. In other words, the point of intersection P2 between the central axis of the line segment 25 and the axis of rotation R will move upwards and to the left when the swiveling motion is to the left, and downwards and to the right when the swiveling motion is counterclockwise.

In the embodiment shown, the rotating flask 2 can be freely swiveled around the swiveling axis S so that, as a function of the level of filling and the intrinsic weight of the rotating flask 2 and of the resultant buoyancy in the liquid F, a state of equilibrium will be established freely and automatically.

A point of intersection of the swiveling axis S with the horizontal H aligned perpendicular to the force of gravity G is designated with the reference numeral P1. The point of intersection P1 of the swiveling axis S with the vertical plane extending from the force of gravity G to the axis of rotation R lies in the midpoint according to FIG. 1, that is to say, in the point of intersection of the diagonals, of the compensating element 50, so that the deformation of the compensating element 50 during the compensation of the swiveling motion around the swiveling axis S can be kept to a minimum.

Figure 3:
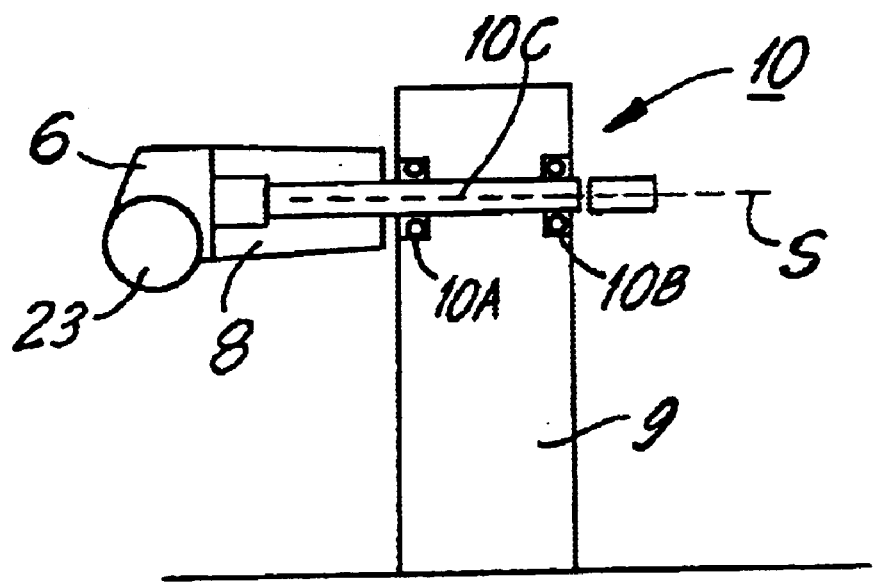
FIG. 3—a side view of a part of the rotary evaporator shown in FIGS. 1 and 2.

FIG. 3 shows a segment of the rotary evaporator according to FIGS. 1 and 2, showing the swiveling bearing 10 in greater detail. The swiveling bearing 10 comprises a swiveling shaft 10C, which is coaxially supported with respect to the (geometrical) swiveling axis S in two partial bearings 10A and 10B, preferably configured as rolling bearings, especially as ball bearings, on both sides of the column-like support means 9.

As can be seen in FIG. 2, a damping device 55 can be provided which is rigidly connected to the swiveling bearing 10 via a counterweight 57 and which ensures play-free support and damping of resonant vibrations of the rotating flask 2. In particular, the damping device 55 can function hydraulically with an oil filling.

In the bending area of the line 26 between the two line portions 24 and 25, there are provided two connections (not specified in greater detail) by which the two thin lines 32 and 33 lead into the interior of line 26 and through the fitting 21 into the receiving area 20 of the rotating flask 2. The line 33 is a feed line that serves to feed the product to be treated, especially a liquid substance to be concentrated or distilled. In this context, the line 33 is connected via a valve in the form of a closing element 13 and another line 36 with a product flask 7 that holds the product. The additional line 32 serves to return or to feed the distillate—especially liquid that has already evaporated and re-condensed—into the receiving area 20 of the rotating flask 2, although this is not absolutely necessary.

During operation of the rotary evaporator, the liquid bath 3 holding the liquid F is regulated to the temperature desired for the rotary evaporator process or to a desired temperature profile by means of a heating means (not shown here). The rotation of the rotating flask 2 around the axis of rotation R creates a thin film, especially a liquid film with the substance(s) to be evaporated, on the inner wall of the receiving area 20. The substance is evaporated in a controlled manner out of this film by supplying energy from the liquid F, and then conveyed upwards to the condenser 4 through the fitting 21, the line 26 and the line 27 as vapor or gas lines. In the condenser 4, there is a heat exchanger 4C through which the vapor releases its heat and condenses out to liquefy again in the condenser 4. The condensate or distillate is collected in a distillate receiver 41 in the lower area of the condenser 4 and then conveyed via a line 35 at the lower end of the distillate receiver 41, via a closure element 11, another line 31, a closure element 12 and via another line 34 to a distillate receiving vessel 5.

The closure element 12 can be configured as a three-way valve or stopcock and it connects line 31 not only with line 34 but also with the above-mentioned line 32. Therefore, depending on the settings of the closure element 12, part or all of the distillate that is flowing through line 31 as it comes out of the distillate receiver 41 can be further conveyed into line 32 and can thus flow back into the receiving area 20 of the rotating flask 2. Therefore, a reflux unit is formed that serves to return distillate that has already evaporated and re-condensed from the cooler 4 back to the receiving area 20 of the rotating flask 2.

If the closure element 11 is closed off, the distillate receiver 41 of the cooler 4 is flooded and the distillate that is no longer flowing via line 35 now flows back directly into the receiving area 20 of the rotating flask 2 via the vapor line, that is to say, lines 27 and 26 as well as fitting 21 as the reflux unit. This leads to improved self-cleaning of the vapor path.

In the arrangement according to the invention, the vapor path for the evaporated product is kept very short and runs practically along the vertical ascending direction of the vapor.

In the normal case, in the receiving area 20 of the rotating flask 2, the product stemming from the product flask 7 contains at least two components having different boiling points or evaporation temperatures, so that only one of or part of the contained substances having a lower boiling point evaporates during the rotary evaporator process, while the substance(s) having the higher boiling points remain in the rotating flask 2. This makes it possible to concentrate or distill the initial product.

Though the present invention was shown and described with references to the preferred embodiment, such is merely illustrative of the present invention and is not to be construed as a limitation thereof, and various modifications to the present invention will be apparent to those skilled in the art. It is, therefore, not intended that the present invention be limited to the disclosed embodiment or details thereof, and the present invention includes all of variations and/or alternative embodiments within the spirit and scope of the present invention as defined by the appended claims.

What is claimed is:

1. A rotary evaporator comprising
   a) a rotating flask (2) to hold substances to be evaporated and
   b) a drive means (6) to rotate the rotating flask around an axis of rotation (R) that runs through the rotating flask,
   c) the rotating flask can be swiveled around a swiveling axis (S) that
      c1) runs outside of the rotating flask and,
      c2) runs above the axis of rotation of the rotating flask relative to the force of gravity (G)
   d) wherein the rotating flask (2) is connected to a first vapor line (26) that does not rotate with the rotating flask (2) and wherein at least one flexible compensating element (50) is provided between a vertical line section (25) of the first vapor line (26) and a second vapor line (27) such that the first vapor line (26) extending between the rotating flask and the compensating element (50) can be swiveled with the rotating flask (2) around the swiveling axis and the second vapor line (27), which follows the compensating element (50) and which cannot be swiveled together with the rotating flask (2) around the swiveling axis (S), and the at least one compensating element (50) connects a vertical line section (25) of the first vapor line (26) with the second vapor line (27) such that said compensating element (50) compensates for the position change between the vertical line section (25) of the first vapor line (26) and the second vapor line (27) that is caused by the swiveling motion.

2. The rotary evaporator according to claim 1, wherein the rotating flask (2) is at least approximately rotation-symmetrical with respect to a center axis of the flask (2).

3. The rotary evaporator according to claim 2, wherein the axis of rotation coincides with the center axis of the flask (2).

4. The rotary evaporator according to claim 1, wherein the rotating flask (2) is mounted in at least one rotary bearing to rotate around the axis of rotation.

5. The rotary evaporator according to claim 1, wherein the second vapor line (27) opens into a condenser (4).

6. The rotary evaporator according to claim 5, wherein the condenser (4) is arranged above the second vapor line (27), at an angle, relative to the force of gravity.

7. The rotary evaporator according to claim 5, wherein the condenser (4) has a distillate reserver (41) to collect distillate that has condensed out in the condenser (4), said distillate receiver (41) is connectable via at least one closure element (11) to a distillate vessel (5) such that, when the closure element (11) is closed and the distillate receiver (41) has been filled, distillate flows back into the rotating flask (2) via a feed line (32).

8. The rotary evaporator according to claim 1, wherein the swiveling axis intersects the first and second vapor lines (26, 27).

9. The rotary evaporator according to claim 8, wherein the swiveling axis (S) intersects the vertical line section (25) of the first vapor line (26) and the second vapor line (27) in the area of the compensating element (50).

10. The rotary evaporator according to claim 9, wherein the swiveling axis runs at least approximately through a mid-point (P1) of the compensating element (50), through a point of intersection of two diagonals of the compensating element (50).

11. The rotary evaporator according to claim 1, wherein the compensating element (50) is one of a flexible hose and a bellows.

12. The rotary evaporator according to claim 1, wherein the second vapor line (27) is positioned essentially parallel to the force of gravity, at least in the area of an end that is connected to the at least one compensating element (50).

13. The rotary evaporator according to one of claim 1, wherein the first vapor line (26) can be swiveled with respect to the second vapor line (27) within a swiveling angular range around the direction of the force of gravity.

14. The rotary evaporator according to claim 1, wherein the first vapor line (26) includes the vertical section (25) that runs perpendicular towards the swiveling axis and a second section (24) that runs one of parallel and coaxial to the axis of rotation.

15. The rotary evaporator according to claim 14, wherein the vertical section (25) and the second section (24) of the first vapor line (26) are connected via a bend and are oriented with respect to each other at an angle of more than 90°.

16. The rotary evaporator according to claim 1, wherein the rotating flask (2) can be swiveled within a swiveling range between a position of the axis of rotation that is horizontal, perpendicular to the force of gravity, and a position of the axis of rotation that is vertical, parallel to the force of gravity.

17. The rotary evaporator according to claim 1, wherein a vertical reference plane encompassing the axis of rotation and the force of gravity lies perpendicular to the swiveling axis and, in every swiveling position of the rotating flask, the point of intersection of the reference plane with the swiveling axis, relative to the force of gravity, lies above a point of intersection of the axis of rotation with a vertical straight line that runs through the point of intersection of the reference plane with the swiveling axis in the direction of the force of gravity.

18. The rotary evaporator according to claim 1, wherein the swiveling axis is near the axis of rotation such that the distance between the swiveling axis and the axis of rotation lies within a range that is two to six times the value of the diameter of the cross section of the first and second vapor lines (26, 27).

19. A rotary evaporator comprising
a) a rotating flask (2) to hold substances to be evaporated,
b) a drive means (6) to rotate the rotating flask (2) around an axis of rotation (R) that runs through the rotating flask (2),
c) a liquid bath (3) into which the rotary evaporator can be immersed,
d) the rotating flask (2) can be swiveled around a swiveling axis (S) that,
   d1) runs outside of the rotating flask (2) and,
   d2) runs above the axis of rotation of the rotating flask (2) relative to the force of gravity (G)
e) wherein the rotating flask (2) can be freely swiveled around the swiveling axis at least within a swiveling range such that the swiveling angular position of the rotating flask (2) and the position of the rotating flask (2) in the liquid bath are established on their own, due to the buoyancy of the rotating flask (2) including the substances therein in the liquid bath.

* * * * *